US012617882B2

(12) United States Patent
Wang et al.

(10) Patent No.: US 12,617,882 B2
(45) Date of Patent: May 5, 2026

(54) HOMOGENEOUS RARE EARTH CATALYST AND PREPARATION METHOD AND USE THEREOF

(71) Applicant: Qingdao University of Science & Technology, Qingdao (CN)

(72) Inventors: Feng Wang, Qingdao (CN); Xuequan Zhang, Qingdao (CN); Heng Liu, Qingdao (CN); Chunyu Zhang, Qingdao (CN)

(73) Assignee: Qingdao University of Science & Technology, Qingdao (CN)

( * ) Notice: Subject to any disclaimer, the term of this patent is extended or adjusted under 35 U.S.C. 154(b) by 649 days.

(21) Appl. No.: 18/080,161

(22) Filed: Dec. 13, 2022

(65) Prior Publication Data

US 2023/0303736 A1 Sep. 28, 2023

(51) Int. Cl.
| | |
|---|---|
| *C08F 136/06* | (2006.01) |
| *C08F 2/06* | (2006.01) |
| *C08F 2/60* | (2006.01) |
| *C08F 4/54* | (2006.01) |
| *C08F 136/08* | (2006.01) |
| *C08F 210/12* | (2006.01) |
| *C08F 236/06* | (2006.01) |
| *C08F 236/08* | (2006.01) |

(52) U.S. Cl.
CPC ............. *C08F 210/12* (2013.01); *C08F 2/06* (2013.01); *C08F 2/60* (2013.01); *C08F 4/545* (2013.01); *C08F 136/06* (2013.01); *C08F 136/08* (2013.01); *C08F 236/06* (2013.01); *C08F 236/08* (2013.01)

(58) Field of Classification Search
CPC .......... C08F 4/545; C08F 36/00; C08F 36/06; C08F 136/06; C08F 136/08; C08F 136/236; C08F 6/08
See application file for complete search history.

(56) References Cited

U.S. PATENT DOCUMENTS

| | | | | |
|---|---|---|---|---|
| 4,461,883 A * | 7/1984 | Takeuchi | ................ | C08F 36/04 526/140 |
| 4,575,538 A * | 3/1986 | Hsieh | .................... | C08F 291/00 526/140 |
| 5,914,377 A * | 6/1999 | Sylvester | ................ | C08C 19/08 525/938 |
| 6,255,416 B1 * | 7/2001 | Sone | ........................ | C08F 36/04 526/159 |
| 6,734,257 B2 * | 5/2004 | Windisch | .............. | C08F 297/06 525/329.9 |
| 6,838,256 B2 * | 1/2005 | Murphy | ............. | C07K 14/4702 435/320.1 |
| 6,908,975 B2 * | 6/2005 | Jang | ...................... | C08F 136/06 526/132 |
| 8,404,785 B2 * | 3/2013 | Tanaka | ..................... | C08K 3/36 525/379 |
| 9,505,859 B2 * | 11/2016 | McCauley | ............ | C08F 136/06 |
| 2018/0030173 A1 * | 2/2018 | Kang | .................... | C08F 136/04 |
| 2019/0359755 A1 * | 11/2019 | Kim | ...................... | C08F 293/00 |

FOREIGN PATENT DOCUMENTS

CN          112194748 A  *  1/2021  ............ C08F 136/08

OTHER PUBLICATIONS

CN-112194748-A (Jan. 8, 2021); machine translation. (Year: 2021).*

* cited by examiner

*Primary Examiner* — Rip A Lee
(74) *Attorney, Agent, or Firm* — NOD Law PC

(57) ABSTRACT

The present disclosure provides a preparation method of a homogeneous rare earth catalyst. In the present disclosure, a depolymerizing agent is introduced into the homogeneous rare earth catalyst to promote complete depolymerization of an alkyl aluminum trimer into monomolecular alkyl aluminum. As a result, there is an increase in the number of the alkyl aluminum which serves as an effective chain transfer agent, resulting in a greatly improved chain transfer rate, such that a polymerization system has completed the chain transfer in an early stage of the reaction. Accordingly, an aluminum terminal molecular chain has an increased concentration, leading to an accelerated exchange with an active center propagating chain and a decreased influence caused by an increased viscosity of the system, maintaining living polymerization of the system.

16 Claims, 2 Drawing Sheets

HOMOGENEOUS RARE EARTH CATALYST AND PREPARATION METHOD AND USE THEREOF

CROSS REFERENCE TO RELATED APPLICATION

This patent application claims the benefit and priority of Chinese Patent Application No. 202111527882.3, filed with the China National Intellectual Property Administration on Dec. 14, 2021, the disclosure of which is incorporated by reference herein in its entirety as part of the present application.

TECHNICAL FIELD

The present disclosure relates to the field of catalytic materials, in particular to a homogeneous rare earth catalyst and a preparation method and use thereof.

BACKGROUND

Ziegler-Natta catalysts are excellent directional polymerization catalysts commonly used in diolefin polymerization. High-cis polybutadiene rubber, polyisoprene rubber, and butadiene-isoprene copolymer rubber are basic types of rubber in the tire manufacturing industry. The industrialized rare earth cis-butadiene rubber and isoprene rubber each have a high cis-1,4-structure content, a desirable linear structure (no short-branched chain), and a regular chain structure (no head-to-head or tail-to-tail structure), as well as performances far superior to those of nickel-based butadiene rubber and cobalt-based butadiene rubber. Therefore, these types of rubber are widely used in the manufacture of high-performance green tires.

For most Ziegler-Natta catalysts, chain transfer reactions are inevitable during catalytic polymerization. On the one hand, the chain transfer reaction can improve a catalytic activity by increasing the number of polymer molecular chains under a preset catalyst dosage, that is, increasing a chain transfer strength means increasing a polymerization activity, and it is difficult to realize industrialization of a coordination polymerization catalytic system without the chain transfer. On the other hand, irreversibility of the chain transfer reaction is another important reason for the uncontrollable polymerization in addition to multi-active site properties. Existing rare earth-based Ziegler-Natta catalysts still have a low activity, especially have irreversible chain transfer when catalyzing coordination polymerization, resulting in uncontrollable polymerization and a broad molecular weight distribution (greater than 2.5) of obtained polymers. Therefore, it is an urgent problem to be solved in the prior art to improve an activity of the rare earth-based Ziegler-Natta catalyst while improving a chain transfer strength of the system and reversibility of the chain transfer reaction during catalytic polymerization.

SUMMARY

An objective of the present disclosure is to provide a homogeneous rare earth catalyst and a preparation method and use thereof. In the present disclosure, the homogeneous rare earth catalyst belongs to a Ziegler-Natta catalyst. When being used to catalyze polymerization of conjugated diolefins, the catalyst can enhance chain transfer and make the chain transfer from irreversible to reversible, breaking through an upper limit of the number of polymer molecular chains generated by each active center (rare earth atom), and achieving unification of a high activity (ie, each active center can generate multiple polymer chains) and controlled polymerization (ie, polymers with a controlled molecular weight and a narrow molecular weight distribution) in theory and practice. Thus, a high-cis diolefin polymer is obtained with a high molecular weight and a narrow molecular weight distribution.

To achieve the above objective of the present disclosure, the present disclosure provides the following technical solutions.

The present disclosure provides a preparation method of a homogeneous rare earth catalyst, including the following steps:

in a dry inert atmosphere, adding an electron donor, alkyl aluminum, and a depolymerizing agent sequentially into a rare earth neodymium-based organic compound to conduct alkylation, and adding a chloride to conduct chlorination to obtain the homogeneous rare earth catalyst; where the rare earth neodymium-based organic compound, the electron donor, the alkyl aluminum, the depolymerizing agent, and the chloride have a molar ratio of 1:(4-22):(8-42):(2-14):(0.8-4).

Preferably, the rare earth neodymium-based organic compound is one selected from the group consisting of neodymium neodecanoate, neodymium isooctanoate, neodymium naphthenate, neodymium isopropoxide, neodymium isobutoxide, neodymium (2-ethylhexyl) phosphonate, and neodymium mono-2-ethylhexyl (2-ethylhexyl) phosphonate.

Preferably, the electron donor is one selected from the group consisting of butadiene, isoprene, piperylene, 1,3,5-hexatriene, and myrcene.

Preferably, the depolymerizing agent is one selected from the group consisting of an alkyl aluminum compound, an alkyl boron compound, a phosphate compound, and a nitrogen-containing compound without active hydrogen.

Preferably, the alkyl aluminum is selected from the group consisting of diisobutylaluminum hydride and diethylaluminum hydride.

Preferably, the alkylation is conducted at 30° C. to 85° C. for 5 min to 40 min.

Preferably, the chloride is selected from the group consisting of dichlorodimethylsilane and ethylaluminium sesquichloride.

Preferably, the chlorination is conducted at 30° C. to 110° C. for 10 min to 80 min.

The present disclosure further provides a homogeneous rare earth catalyst prepared by the preparation method.

The present disclosure further provides use of the homogeneous rare earth catalyst in polymerization of a conjugated diolefin.

The present disclosure provides a preparation method of a homogeneous rare earth catalyst. In the present disclosure, in the dry inert atmosphere, a certain amount of the electron donor is coordinated with the rare earth neodymium-based organic compound, which is beneficial to obtain a homogeneous catalyst; the coordinated rare earth neodymium-based organic compound undergoes alkylation, and then chlorination to obtain the homogeneous rare earth catalyst. The introduction of a certain amount of the depolymerizing agent into the homogeneous rare earth catalyst promotes complete depolymerization of an alkyl aluminum trimer, and converts it into a single molecular chain transfer agent alkyl aluminum, which increases the number of effective chain transfer agent alkyl aluminum, such that chain transfer is greatly accelerated. On the one hand, a chain transfer reaction has been completed at an initial stage of the reaction (the alkyl aluminum has been consumed completely), and the chain transfer reaction does not occur in the subsequent polymerization. On the other hand, an aluminum terminal molecular chain (dormant chain) has an increased concentration, leading to an accelerated exchange with an active center propagating chain and a decreased influence caused by an increased viscosity (molecular weight) of the system, maintaining living polymerization of the system. Therefore, a high-cis conjugated diolefin polymer can be synthesized with a high molecular weight and a narrow molecular weight distribution, while laying a foundation for further long-chain branching and functionalization. Due to depolymerization of the alkyl aluminum trimer into monomolecular alkyl aluminum, under a given molar ratio of [alkyl aluminum]/[Nd], an upper limit of the number of [alkyl aluminum]/3 molecular chains per molecular catalytic center can be broken through, thereby greatly increasing the catalytic activity. Since the alkyl aluminum has a significantly increased effective concentration, a dosage of the relatively expensive alkyl aluminum can be effectively decreased to reduce a production cost. The conjugated diolefin polymer prepared by the homogeneous rare earth catalyst has a number average molecular weight reaching 320,000, a cis-1,4 structure content of greater than 96.0%, and an $M_w/M_n$ ratio of less than 2.0. Even if the monomer and the catalyst have a molar ratio of rare earth atoms at as high as 30,000, the polymerization product still has a molecular weight distribution of less than 2, and reversible chain transfer can be still maintained during the polymerization, with an average of no less than nine polymer chains per active center.

DETAILED DESCRIPTION OF THE EMBODIMENTS

Figure 1:
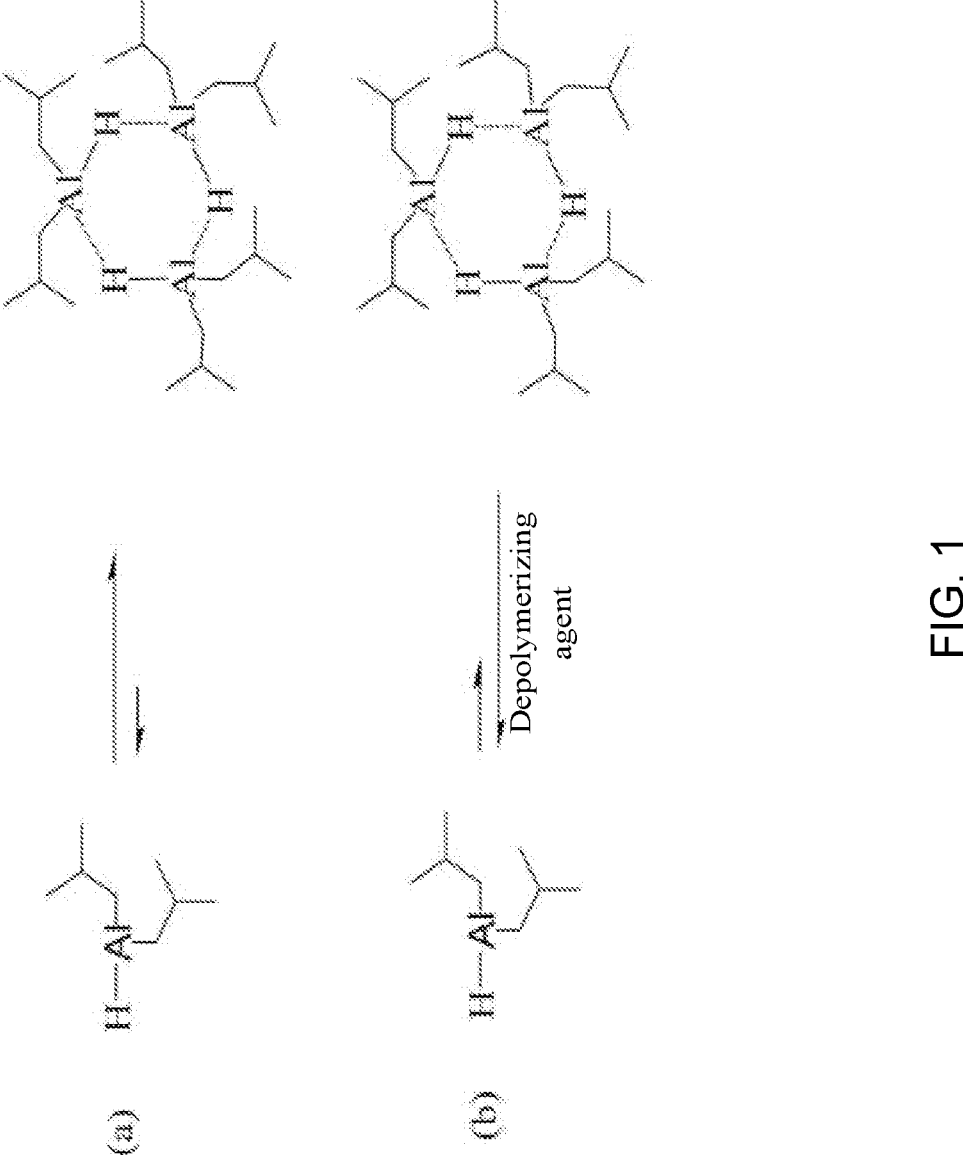
FIG. 1 shows a comparison for formation of a trimer formed by alkyl aluminum and a depolymerization effect of a depolymerizing agent on the trimer when the alkyl aluminum is diisobutylaluminum hydride in the present disclosure.

The present disclosure provides a preparation method of a homogeneous rare earth catalyst, including the following steps:

in a dry inert atmosphere, adding an electron donor, alkyl aluminum, and a depolymerizing agent sequentially into a rare earth neodymium-based organic compound to conduct alkylation, and adding a chloride to conduct chlorination to obtain the homogeneous rare earth catalyst; where the rare earth neodymium-based organic compound, the electron donor, the alkyl aluminum, the depolymerizing agent, and the chloride have a molar ratio of 1:(4-22):(8-42):(2-14):(0.8-4).

In the present disclosure, unless otherwise specified, all raw materials used are commercially available products conventional in the art.

In the present disclosure, the dry inert atmosphere is to avoid deactivation of the prepared homogeneous catalyst by reaction with oxygen and water.

In the present disclosure, the rare earth neodymium-based organic compound is preferably one selected from the group consisting of neodymium neodecanoate, neodymium isooctanoate, neodymium naphthenate, neodymium isopropoxide, neodymium isobutoxide, neodymium (2-ethylhexyl) phosphonate, and neodymium mono-2-ethylhexyl (2-ethylhexyl) phosphonate.

In the present disclosure, the electron donor is preferably one selected from the group consisting of butadiene, isoprene, piperylene, 1,3,5-hexatriene, and myrcene. The coordination between the electron donor and the rare earth neodymium-based organic compound is favorable for preparing a homogeneous rare earth catalyst in a homogeneous state.

In the present disclosure, the depolymerizing agent is preferably one selected from the group consisting of an alkyl aluminum compound, an alkyl boron compound, a phosphate compound, and a nitrogen-containing compound without active hydrogen. The alkyl aluminum compound is preferably one selected from the group consisting of triethylaluminum, triisobutylaluminum, trihexylaluminum, and trioctylaluminum; the alkyl boron compound is preferably one selected from the group consisting of triethyl borane, triallylborane, and tri-n-butyl borane; the phosphate compound is preferably one selected from the group consisting of triethyl phosphate, tributyl phosphate, and triphenyl phosphate; and the nitrogen-containing compound without active hydrogen is preferably one selected from the group consisting of triethylamine, tri-n-butylamine, trioctylamine, pyridine, and 2,6-dibromopyridine. The depolymerizing agent is preferably added in the form of a hexane solution.

In the present disclosure, the alkyl aluminum is preferably selected from the group consisting of diisobutylaluminum hydride and diethylaluminum hydride.

In the present disclosure, the alkylation is conducted at preferably 30° C. to 85° C., more preferably 35° C. to 80° C. for preferably 5 min to 40 min, more preferably 6 min to 35 min. Controlling the reaction temperature and time of the alkylation within the above ranges can promote the alkylation of the rare earth neodymium-based organic compound sufficiently, so as to improve a yield of the homogeneous rare earth catalyst.

In the present disclosure, the chloride is preferably selected from the group consisting of dichlorodimethylsilane and ethylaluminium sesquichloride.

In the present disclosure, the rare earth neodymium-based organic compound, the electron donor, the alkyl aluminum, the depolymerizing agent, and the chloride have a molar ratio of preferably 1:(4-22):(8-42):(2-14):(0.8-4), more preferably 1:(5-20):(10-40):(3-12):(1-3). By controlling the molar ratio of the rare earth neodymium-based organic compound and the electron donor within a certain range, the above two are fully coordinated to obtain a catalyst in a homogeneous state. It is avoided that the electron donor has an extremely low dosage, leading to a non-obvious coordination effect to obtain a heterogeneous catalyst. By controlling the molar ratio of the rare earth neodymium-based organic compound and the alkyl aluminum within a certain range, it is conducive to the full alkylation of the above two, avoiding the incomplete alkylation caused by a low dosage of the alkyl aluminum, and avoiding obtaining a heterogeneous catalyst caused by a high dosage of the alkyl aluminum. By controlling the molar ratio of the alkyl aluminum and the depolymerizing agent within a certain range, the complete depolymerization of an alkyl aluminum trimer is promoted and converted into a monomolecular chain transfer agent alkyl aluminum, such that the number of the effective chain transfer agent alkyl aluminum increases, thereby accelerating chain transfer; in addition, it is avoided that the depolymerizing agent has an excessively high dosage, which forms a coordination effect with the rare earth neodymium-based organic compound to reduce an activity of the homogeneous rare earth catalyst. By controlling the molar ratio of the rare earth neodymium-based organic compound and the chloride within a certain range, it is avoided that the chloride has an extremely low dosage to cause incomplete chlorination to reduce an activity of the homogeneous rare earth catalyst; in addition, it is avoided that the chloride has an excessively high dosage to form a by-product rare earth chloride, such that a heterogeneous catalyst is obtained to reduce the activity of the homogeneous rare earth catalyst, leading to catalytic polymerization to obtain a polymer with a broad molecular weight distribution.

In the present disclosure, the chlorination is conducted at preferably 30° C. to 110° C., more preferably 35° C. to 100° C. for preferably 10 min to 80 min, more preferably 13 min to 70 min. Controlling the reaction temperature and time of the chlorination within the above ranges enables the chlorination to sufficiently occur to obtain a homogeneous rare earth catalyst with a high yield.

The present disclosure further provides a homogeneous rare earth catalyst prepared by the preparation method.

The present disclosure further provides use of the homogeneous rare earth catalyst in polymerization of a conjugated diolefin. When the homogeneous rare earth catalyst is used to catalyze the polymerization of conjugated diolefins, a high-cis diolefin polymer can be generated with a high molecular weight and a narrow molecular weight distribution, which has a cis-1,4 structure content of greater than 96.0% and an $M_w/M_n$ ratio of less than 2.0.

In the present disclosure, a use method of the homogeneous rare earth catalyst in polymerization of a conjugated diolefin includes preferably the following steps:

in a dry ampoule filled with nitrogen, adding a hexane solution of a conjugated diolefin monomer and the homogeneous rare earth catalyst in sequence, and conducting polymerization at 20° C. to 80° C. for 1 h to 12 h; adding an ethanol solution of 2,6-di-tert-butyl-p-cresol with a mass fraction of 1% to terminate the reaction; and subjecting a polymerization product to ethanol precipitation, washing, and drying sequentially to obtain a diolefin polymer.

In the present disclosure, the conjugated diolefin monomer is preferably one or two selected from the group consisting of butadiene and isoprene; and the conjugated diolefin monomer and the homogeneous rare earth catalyst have a molar ratio of preferably (200-50000):1.

In the present disclosure, the polymerization is conducted at more preferably 30° C. to 80° C. for more preferably 3 h to 12 h.

The technical solutions of the present disclosure will be described below clearly and completely in conjunction with the examples of the present disclosure. Apparently, the described examples are merely some rather than all of the embodiments of the present disclosure. All other embodiments obtained by those of ordinary skill in the art based on the embodiments of the present disclosure without creative efforts shall fall within the protection scope of the present disclosure.

FIG. 1 shows a comparison for formation of a trimer formed by alkyl aluminum and a depolymerization effect of a depolymerizing agent on the trimer when the alkyl aluminum is diisobutylaluminum hydride. As can be seen from FIG. 1, the depolymerizing agent is used to promote the complete depolymerization of the alkyl aluminum trimer and convert it into a single molecular chain transfer agent alkyl aluminum, which increases the number of effective chain transfer agent alkyl aluminum, such that the chain transfer is greatly accelerated.

Example 1

A preparation method of a homogeneous rare earth catalyst

In a 10 mL ampoule that was vacuum-baked and filled with nitrogen, butadiene serving as an electron donor, diisobutylaluminum hydride serving as alkyl aluminum, and a hexane solution of tri-n-butylamine serving as a depolymerizing agent were added to neodymium neodecanoate serving as a rare earth neodymium-based organic compound in sequence; alkylation was conducted at 40° C. for 30 min until an obtained reaction system solution changed color; and ethylaluminium sesquichloride serving as a chloride was added, and chlorination was conducted at 40° C. for 60 min to obtain a homogeneous rare earth catalyst 1; where the rare earth neodymium-based organic compound, the electron donor, the alkyl aluminum, the depolymerizing agent, and the chloride had a molar ratio of 1:10:10:10:3.

Example 2

A homogeneous rare earth catalyst 2 was prepared according to the method of Example 1; and this example differed from Example 1 in that the depolymerizing agent was triphenylphosphine.

Example 3

A homogeneous rare earth catalyst 3 was prepared according to the method of Example 1; and this example differed from Example 1 in that the depolymerizing agent was tributylphosphine.

Example 4

A homogeneous rare earth catalyst 4 was prepared according to the method of Example 1; and this example differed from Example 1 in that the depolymerizing agent was triethylaluminum.

Example 5

A homogeneous rare earth catalyst 5 was prepared according to the method of Example 1; and this example differed from Example 1 in that the electron donor was isoprene, the depolymerizing agent was triisobutylaluminum, and the chloride was dichlorodimethylsilane; and the rare earth neodymium-based organic compound, the electron donor, the alkyl aluminum, the depolymerizing agent, and the chloride had a molar ratio of 1:5:10:10:3.

Example 6

A homogeneous rare earth catalyst 6 was prepared according to the method of Example 1; and this example differed from Example 1 in that the rare earth neodymium-based organic compound was neodymium isobutoxide, the electron donor was myrcene, the depolymerizing agent was trihexylaluminum, and the chloride was dichlorodimethylsilane; and the rare earth neodymium-based organic compound, the electron donor, the alkyl aluminum, the depolymerizing agent, and the chloride had a molar ratio of 1:5:10:10:3.

Example 7

A homogeneous rare earth catalyst 7 was prepared according to the method of Example 1; and
this example differed from Example 1 in that the rare earth neodymium organic compound was neodymium isobutoxide, the electron donor was 1,3,5-hexatriene, the depolymerizing agent was trioctylaluminum, and the chloride was dichlorodimethylsilane; and the rare earth neodymium-based organic compound, the electron donor, the alkyl aluminum, the depolymerizing agent, and the chloride had a molar ratio of 1:5:20:5:2.

Example 8

In a 10 mL ampoule that was vacuum-baked and filled with nitrogen, butadiene serving as an electron donor, diisobutylaluminum hydride serving as alkyl aluminum, and a hexane solution of triethyl borane serving as a depolymerizing agent were added to neodymium isooctanoate serving as a rare earth neodymium-based organic compound in sequence; alkylation was conducted at 50° C. for 10 min until an obtained reaction system solution changed color; and ethylaluminium sesquichloride serving as a chloride was added, and chlorination was conducted at 40° C. for 60 min to obtain a homogeneous rare earth catalyst 8; where
the rare earth neodymium-based organic compound, the electron donor, the alkyl aluminum, the depolymerizing agent, and the chloride had a molar ratio of 1:10:20:10:1.

Example 9

In a 10 mL ampoule that was vacuum-baked and filled with nitrogen, butadiene serving as an electron donor, diisobutylaluminum hydride serving as alkyl aluminum, and a hexane solution of tri-n-butyl borane serving as a depolymerizing agent were added to neodymium (2-ethylhexyl) phosphonate serving as a rare earth neodymium-based organic compound in sequence; alkylation was conducted at 60° C. for 10 min until an obtained reaction system solution changed color; and ethylaluminium sesquichloride serving as a chloride was added, and chlorination was conducted at 40° C. for 60 min to obtain a homogeneous rare earth catalyst 9; where
the rare earth neodymium-based organic compound, the electron donor, the alkyl aluminum, the depolymerizing agent, and the chloride had a molar ratio of 1:10:30:10:2.

Example 10

In a 10 mL ampoule that was vacuum-baked and filled with nitrogen, butadiene serving as an electron donor, diisobutylaluminum hydride serving as alkyl aluminum, and a hexane solution of triallylborane serving as a depolymerizing agent were added to neodymium mono-2-ethylhexyl (2-ethylhexyl)phosphonate serving as a rare earth neodymium-based organic compound in sequence; alkylation was conducted at 60° C. for 10 min until an obtained reaction system solution changed color; and ethylaluminium sesquichloride serving as a chloride was added, and chlorination was conducted at 40° C. for 60 min to obtain a homogeneous rare earth catalyst 10; where the rare earth neodymium-based organic compound, the electron donor, the alkyl aluminum, the depolymerizing agent, and the chloride in step (2) had a molar ratio of 1:20:20:5:2.

Example 11

In a 10 mL ampoule that was vacuum-baked and filled with nitrogen, myrcene serving as an electron donor, diisobutylaluminum hydride serving as alkyl aluminum, and a hexane solution of triethyl phosphate serving as a depolymerizing agent were added to neodymium isopropoxide serving as a rare earth neodymium-based organic compound in sequence; alkylation was conducted at 60° C. for 10 min until an obtained reaction system solution changed color; and ethylaluminium sesquichloride serving as a chloride was added, and chlorination was conducted at 40° C. for 60 min to obtain a homogeneous rare earth catalyst 11; where
the rare earth neodymium-based organic compound, the electron donor, the alkyl aluminum, the depolymerizing agent, and the chloride had a molar ratio of 1:10:20:5:2.

Example 12

In a 10 mL ampoule that was vacuum-baked and filled with nitrogen, piperylene serving as an electron donor, diisobutylaluminum hydride serving as alkyl aluminum, and a hexane solution of tributyl phosphate serving as a depolymerizing agent were added to neodymium isopropoxide serving as a rare earth neodymium-based organic compound in sequence; alkylation was conducted at 60° C. for 10 min until an obtained reaction system solution changed color; and dichlorodimethylsilane serving as a chloride was added, and chlorination was conducted at 50° C. for 40 min to obtain a homogeneous rare earth catalyst 12; where
the rare earth neodymium-based organic compound, the electron donor, the alkyl aluminum, the depolymerizing agent, and the chloride had a molar ratio of 1:5:40:12:2.

Example 13

In a 10 mL ampoule that was vacuum-baked and filled with nitrogen, piperylene serving as an electron donor, diisobutylaluminum hydride serving as alkyl aluminum, and a hexane solution of triphenyl phosphate serving as a depolymerizing agent were added to neodymium naphthenate serving as a rare earth neodymium-based organic compound in sequence; alkylation was conducted at 60° C. for 10 min until an obtained reaction system solution changed color; and dichlorodimethylsilane serving as a chloride was added, and chlorination was conducted at 60° C. for 40 min to obtain a homogeneous rare earth catalyst 13; where
the rare earth neodymium-based organic compound, the electron donor, the alkyl aluminum, the depolymerizing agent, and the chloride had a molar ratio of 1:20:10:3:2.

Example 14

In a 10 mL ampoule that was vacuum-baked and filled with nitrogen, butadiene serving as an electron donor, diisobutylaluminum hydride serving as alkyl aluminum, and a hexane solution of triethylamine serving as a depolymerizing agent were added to neodymium naphthenate serving as a rare earth neodymium-based organic compound in sequence; alkylation was conducted at 60° C. for 10 min until an obtained reaction system solution changed color; and dichlorodimethylsilane serving as a chloride was added, and chlorination was conducted at 60° C. for 40 min to obtain a homogeneous rare earth catalyst 14; where the rare earth neodymium-based organic compound, the electron donor, the alkyl aluminum, the depolymerizing agent, and the chloride had a molar ratio of 1:20:20:5:2.

Example 15

In a 10 mL ampoule that was vacuum-baked and filled with nitrogen, isoprene serving as an electron donor, diethylaluminum hydride serving as alkyl aluminum, and a hexane solution of tri-n-butylamine serving as a depolymerizing agent were added to neodymium propoxide serving as a rare earth neodymium-based organic compound in sequence; alkylation was conducted at 70° C. for 5 min until an obtained reaction system solution changed color; and dichlorodimethylsilane serving as a chloride was added, and chlorination was conducted at 100° C. for 15 min to obtain a homogeneous rare earth catalyst 15; where the rare earth neodymium-based organic compound, the electron donor, the alkyl aluminum, the depolymerizing agent, and the chloride had a molar ratio of 1:10:40:7:2.

Example 16

A homogeneous rare earth catalyst 16 was prepared according to the method of Example 15; and this example differed from Example 15 in that the depolymerizing agent was pyridine.

Example 17

In a 10 mL ampoule that was vacuum-baked and filled with nitrogen, isoprene serving as an electron donor, diethylaluminum hydride serving as alkyl aluminum, and a hexane solution of trioctylamine serving as a depolymerizing agent were added to neodymium propoxide serving as a rare earth neodymium-based organic compound in sequence; alkylation was conducted at 60° C. for 10 min until an obtained reaction system solution changed color; and ethylaluminium sesquichloride serving as a chloride was added, and chlorination was conducted at 60° C. for 40 min to obtain a homogeneous rare earth catalyst 17; where the rare earth neodymium-based organic compound, the electron donor, the alkyl aluminum, the depolymerizing agent, and the chloride had a molar ratio of 1:10:20:5:3.

Example 18

In a 10 mL ampoule that was vacuum-baked and filled with nitrogen, isoprene serving as an electron donor, diethylaluminum hydride serving as alkyl aluminum, and a hexane solution of 2,6-dibromopyridine serving as a depolymerizing agent were added to neodymium propoxide serving as a rare earth neodymium-based organic compound in sequence; alkylation was conducted at 60° C. for 10 min until an obtained reaction system solution changed color; and dichlorodimethylsilane serving as a chloride was added, and chlorination was conducted at 60° C. for 10 min to obtain a homogeneous rare earth catalyst 18; where the rare earth neodymium-based organic compound, the electron donor, the alkyl aluminum, the depolymerizing agent, and the chloride had a molar ratio of 1:10:40:10:3.

Comparative Example 1' to 18'

According to the preparation methods of Examples 1 to 18, rare earth catalysts 1' to 18' were prepared correspondingly, respectively, and a difference from Examples 1 to 18 was that no depolymerizing agent was added.

Use Example

Butadiene and isoprene were homopolymerized separately and the two were copolymerized, and a yield of polymer products polybutadiene, polyisoprene, and a butadiene-isoprene copolymer obtained was calculated by a weight method;

theoretical molecular weight of polymer=(molar mass of monomer)×yield×[amount of substance of monomer]/[amount of substance of rare earth atoms in catalyst];

the theoretical molecular weight of polybutadiene was calculated according to $M_n^{theo}=54\times Yield\times[BD]/[Nd]$, where 54 was a molar mass of the butadiene monomer, and [BD]/[Nd] was a molar ratio of the butadiene monomer and the rare earth atoms in the catalyst;

the theoretical molecular weight of polyisoprene was calculated according to $M_n^{theo}=68\times Yield\times[IP]/[Nd]$, where 68 represented a molar mass of the butadiene monomer, and [IP]/[Nd] was a molar ratio of the isoprene monomer and the rare earth atoms in the catalyst;

the theoretical molecular weight of the butadiene-isoprene copolymer was calculated according to $M_n^{theo}=(54\times[BD]/[Nd]+68\times[IP]/[Nd])\times Yield$;

the actual molecular weight $M_n^{exp}$ and the molecular weight distribution $M_w/M_n$ of the polymerization product were measured by gel permeation chromatography (GPC), and the average number of polymer chains produced per active center (per rare earth element) $N_p$ was calculated by $N_p=M_n^{theo}/M_n^{exp}$;

the content of cis-1,4 structure content in polybutadiene and polyisoprene was calculated from NMR spectra.

I. Homogeneous Rare Earth Catalysts 1 to 18 and Rare Earth Catalysts 1' to 18' Used in Catalyzing Homopolymerization of Butadiene In a dry 100 mL ampoule filled with nitrogen, a hexane solution of butadiene (with a concentration of 1.85 mol/L) and a catalyst (one of the homogeneous rare earth catalysts 1 to 18 and the rare earth catalysts 1' to 18'), where the butadiene monomer and the rare earth element had a molar ratio [BD]/[Nd] of 10000; polymerization was conducted at 50° C.; after the polymerization was completed, a product was subjected to reaction termination, washing, and drying in sequence to obtain colorless, transparent, and gel-free polybutadiene rubber. The results were shown in Tables 1 and 2.

TABLE 1

Homopolymerization of butadiene catalyzed by homogeneous rare earth catalysts 1 to 18

| Use Example | Homogeneous rare earth catalyst | Polymerization time (h) | Yield (wt %) | $M_n^{theo}$ (*$10^4$) | $M_n^{exp}$ (*$10^4$) | $M_w/M_n$ | Cis-1,4% | $N_p$ |
|---|---|---|---|---|---|---|---|---|
| 1 | 1 | 6 | 93.6 | 50.5 | 4.59 | 1.95 | 96.8 | 11 |
| 2 | 2 | 6 | 92.3 | 49.8 | 4.97 | 1.91 | 96.7 | 10 |
| 3 | 3 | 6 | 91.5 | 49.4 | 4.93 | 1.90 | 96.3 | 10 |
| 4 | 4 | 6 | 93.9 | 50.7 | 5.63 | 1.95 | 96.8 | 9 |
| 5 | 5 | 6 | 95.2 | 51.3 | 4.66 | 1.89 | 95.0 | 11 |
| 6 | 6 | 6 | 98.3 | 53.1 | 4.42 | 1.54 | 96.7 | 12 |
| 7 | 7 | 6 | 95.1 | 51.3 | 3.21 | 1.76 | 95.5 | 16 |
| 8 | 8 | 6 | 96.1 | 51.8 | 3.24 | 1.93 | 95.9 | 16 |
| 9 | 9 | 6 | 95.1 | 51.3 | 2.45 | 1.9 | 95.0 | 21 |
| 10 | 10 | 6 | 96.8 | 52.2 | 3.48 | 1.95 | 97.0 | 15 |
| 11 | 11 | 6 | 96.7 | 52.2 | 6.53 | 1.97 | 96.7 | 8 |
| 12 | 12 | 6 | 96.8 | 52.3 | 2.09 | 1.98 | 96.8 | 25 |
| 13 | 13 | 6 | 97.0 | 52.4 | 7.48 | 1.88 | 97.7 | 7 |
| 14 | 14 | 6 | 95.9 | 51.8 | 3.98 | 1.85 | 97.8 | 13 |
| 15 | 15 | 6 | 98.5 | 53.2 | 2.22 | 1.92 | 97.5 | 24 |
| 16 | 16 | 6 | 95.2 | 51.4 | 2.14 | 1.65 | 97.5 | 24 |
| 17 | 17 | 6 | 98.2 | 53.0 | 3.79 | 1.95 | 95.4 | 14 |
| 18 | 18 | 6 | 95.1 | 51.4 | 2.05 | 1.88 | 95.8 | 25 |

TABLE 2

Homopolymerization of butadiene catalyzed by rare earth catalysts 1' to 18'

| Comparative Example | Rare earth catalyst | Polymerization time (h) | Yield (wt %) | $M_n^{theo}$ (*$10^4$) | $M_n^{exp}$ (*$10^4$) | $M_w/M_n$ | $N_p$ |
|---|---|---|---|---|---|---|---|
| 1 | 1' | 6 | 81.5 | 44.0 | 22.3 | 3.42 | 2.0 |
| 2 | 2' | 6 | 64.3 | 34.7 | 31.5 | 3.56 | 1.1 |
| 3 | 3' | 6 | 82.8 | 44.7 | 25.8 | 3.68 | 1.7 |
| 4 | 4' | 6 | 68.9 | 37.2 | 11.4 | 3.37 | 3.3 |
| 5 | 5' | 6 | 75.3 | 40.7 | 9.6 | 3.82 | 4.2 |
| 6 | 6' | 6 | 78.4 | 42.3 | 10.3 | 4.12 | 4.1 |
| 7 | 7' | 6 | 93.4 | 50.4 | 9.2 | 3.95 | 5.5 |
| 8 | 8' | 6 | 95.1 | 51.4 | 11.9 | 3.98 | 4.3 |
| 9 | 9' | 6 | 96.5 | 52.1 | 10.2 | 3.86 | 5.1 |
| 10 | 10' | 6 | 96.8 | 52.3 | 9.4 | 4.26 | 5.6 |
| 11 | 11' | 6 | 93.4 | 50.4 | 10.5 | 5.13 | 4.8 |
| 12 | 12' | 6 | 91.2 | 49.2 | 11.1 | 5.96 | 4.4 |
| 13 | 13' | 6 | 86.7 | 46.8 | 10.3 | 3.98 | 4.5 |
| 14 | 14' | 6 | 88.5 | 47.8 | 9.5 | 4.53 | 5.0 |
| 15 | 15' | 6 | 84.3 | 45.5 | 8.8 | 4.24 | 5.2 |
| 16 | 16' | 6 | 85.8 | 46.3 | 11.1 | 5.1 | 4.2 |
| 17 | 17' | 6 | 92.5 | 50.0 | 10.4 | 4.13 | 4.8 |
| 18 | 18' | 6 | 94.1 | 50.8 | 10.1 | 3.98 | 5.0 |

It was seen from Tables 1 and 2 that when the homogeneous rare earth catalysts 1 to 18 prepared by adding a depolymerizing agent were used to catalyze the homopolymerization of butadiene, there were averagely greater than 9 polymer chains produced by each active center, a cis-1,4 structure content was greater than 95%, and an $M_w/M_n$ ratio was less than 2.0; however, when the rare earth catalysts 1' to 18' prepared without the depolymerizing agent were used to catalyze the homopolymerization of butadiene, there were averagely only 1 to 5 polymer chains produced by each active center, and the obtained polymer had a broader molecular weight distribution. It indicated that the depolymerizing agent played a crucial role in performances of the homogeneous rare earth catalyst, helping to make it have a high catalytic activity and controllable catalytic polymerization, so as to prepare high-cis conjugated diolefin polymers with a narrow molecular weight distribution.

II. Influence of Molar Ratio ([BD]/[Nd]) of Butadiene Monomer and Rare Earth Atoms in Catalyst on Homopolymerization of Butadiene In a dry 100 mL ampoule filled with nitrogen, a hexane solution of butadiene (with a concentration of 1.85 mol/L) and a catalyst (one of the homogeneous rare earth catalysts 6, 9, 12, 14, and 18) at a certain ratio ([BD]/[Nd]=3000-30000) were added sequentially; polymerization was conducted; after the polymerization was completed, a product was subjected to reaction termination, washing, and drying in sequence to obtain colorless, transparent, and gel-free polybutadiene rubber. The results were shown in Table 3.

TABLE 3

Influence of [BD]/[Nd] on homopolymerization of butadiene

| Use Example | Homogeneous rare earth catalyst | Polymerization temperature (° C.) | [BD]/[Nd] | Polymerization time (h) | Yield (wt %) | $M_n^{theo}$ (*10⁴) | $M_n^{exp}$ (*10⁴) | $M_w/M_n$ | Cis-1,4% | $N_p$ |
|---|---|---|---|---|---|---|---|---|---|---|
| 19 | 6 | 20 | 3000 | 4 | 100 | 16.2 | 1.35 | 1.58 | 96.1 | 12 |
| 20 | 6 | 50 | 5000 | 4 | 93.9 | 25.4 | 2.30 | 1.62 | 96.5 | 11 |
| 21 | 6 | 50 | 15000 | 6 | 92.3 | 74.8 | 6.23 | 1.85 | 96.8 | 12 |
| 22 | 6 | 50 | 30000 | 8 | 85.8 | 139.0 | 11.6 | 1.94 | 96.7 | 12 |
| 23 | 6 | 50 | 50000 | 6 | 84.5 | 228.2 | 28.5 | 2.23 | 97.1 | 8 |
| 24 | 6 | 80 | 10000 | 1 | 94.3 | 50.9 | 4.24 | 1.78 | 96.6 | 12 |
| 25 | 9 | 50 | 3000 | 6 | 99.1 | 16.1 | 0.76 | 1.52 | 96.5 | 21 |
| 26 | 9 | 50 | 15000 | 6 | 95.1 | 77.0 | 3.85 | 1.61 | 96.9 | 20 |
| 27 | 9 | 50 | 25000 | 6 | 86.7 | 117.0 | 6.50 | 1.9 | 97.8 | 18 |
| 28 | 12 | 60 | 3000 | 1 | 100 | 16.2 | 0.65 | 1.42 | 97.9 | 25 |
| 29 | 12 | 60 | 15000 | 6 | 96.7 | 78.3 | 3.92 | 1.88 | 97.8 | 20 |
| 30 | 12 | 60 | 25000 | 6 | 89.5 | 120.8 | 6.04 | 1.98 | 96.9 | 20 |
| 31 | 14 | 50 | 3000 | 4 | 99.2 | 16.1 | 1.24 | 1.38 | 97.9 | 13 |
| 32 | 14 | 50 | 15000 | 6 | 95.7 | 77.5 | 6.46 | 1.85 | 97.5 | 12 |
| 33 | 14 | 50 | 25000 | 6 | 88.1 | 118.9 | 9.91 | 1.92 | 97.9 | 12 |
| 34 | 18 | 50 | 3000 | 4 | 98.2 | 15.9 | 0.66 | 1.25 | 96.8 | 24 |
| 35 | 18 | 50 | 15000 | 6 | 15.8 | 12.8 | 0.56 | 1.75 | 98.0 | 23 |
| 36 | 18 | 50 | 25000 | 6 | 88.5 | 119.5 | 5.19 | 1.88 | 97.6 | 23 |

Figure 2:
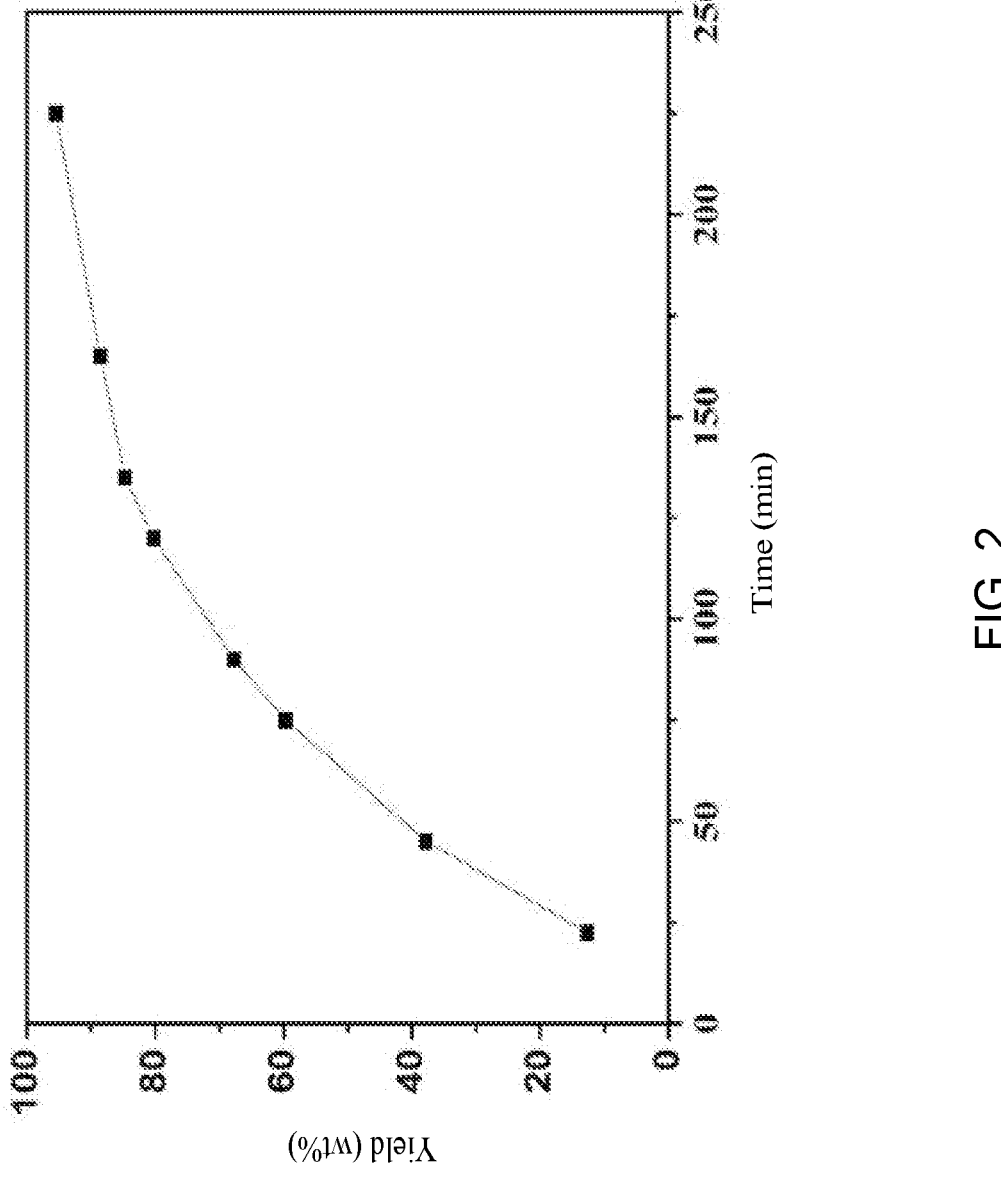
FIG. 2 shows a relationship between a polymerization time and a yield of homopolymerization of butadiene catalyzed by a homogeneous rare earth catalyst 4 in the present disclosure.

It was seen from Table 3 that: when the homogeneous rare earth catalysts 6, 9, 12, 14, and 18 were used in catalyzing the homopolymerization of butadiene, even if the [BD]/[Nd] ratio was as high as 50,000, a theoretical molecular weight was 2.282 million; however, an actual molecular weight was 285,000, and a molecular weight distribution was less than 2, indicating that reversible chain transfer was still maintained during the polymerization, resulting in controllable polymerization; there were averagely no less than 10 polymer chains per active center, indicating that the homogeneous rare earth catalyst had a high activity;

FIG. 2 showed a relationship between a polymerization time and a yield of homopolymerization of butadiene cata- III. Homogeneous Rare Earth Catalysts 1 to 18 Separately Used in Catalyzing Homopolymerization of Isoprene In a dry 100 mL ampoule filled with nitrogen, a hexane solution of isoprene (with a concentration of 1.5 mol/L) and a catalyst (one of the homogeneous rare earth catalysts 1 to 18) were added in sequence, where the isoprene monomer and the rare earth element had a molar ratio [IP]/[Nd] of 10000; polymerization was conducted at 50° C. for 4 h; after the polymerization was completed, a product was subjected to reaction termination, washing, and drying in sequence to obtain colorless, transparent, and gel-free polyisoprene rubber. The results were shown in Table 4.

TABLE 4

Homopolymerization of isoprene catalyzed by homogeneous rare earth catalysts 1 to 18

| Use Example | Homogeneous rare earth catalyst | Yield (wt %) | $M_n^{theo}$ (*10⁴) | $M_n^{exp}$ (*10⁴) | $M_w/M_n$ | Cis-1,4% | $N_p$ |
|---|---|---|---|---|---|---|---|
| 37 | 1 | 93.9 | 63.9 | 9.12 | 1.85 | 96.8 | 7 |
| 38 | 2 | 95.2 | 64.7 | 5.39 | 1.89 | 95.2 | 12 |
| 39 | 3 | 98.3 | 66.8 | 6.08 | 1.64 | 97.1 | 11 |
| 40 | 4 | 95.1 | 64.7 | 4.04 | 1.76 | 95.8 | 16 |
| 41 | 5 | 96.1 | 65.3 | 4.36 | 1.93 | 95.9 | 15 |
| 42 | 6 | 95.1 | 64.7 | 3.08 | 1.91 | 95.6 | 21 |
| 43 | 7 | 96.8 | 65.8 | 3.87 | 1.98 | 97.3 | 17 |
| 44 | 8 | 96.7 | 65.8 | 8.22 | 1.95 | 97.1 | 8 |
| 45 | 9 | 96.8 | 65.8 | 2.63 | 1.97 | 96.8 | 25 |
| 46 | 10 | 97.0 | 66.0 | 9.42 | 1.89 | 97.2 | 7 |
| 47 | 11 | 95.9 | 65.2 | 4.66 | 1.86 | 97.5 | 14 |
| 48 | 12 | 98.5 | 67.0 | 2.79 | 1.87 | 97.0 | 24 |
| 49 | 13 | 95.2 | 64.7 | 2.70 | 1.65 | 96.8 | 24 |
| 50 | 14 | 98.2 | 66.8 | 4.77 | 1.78 | 95.6 | 14 |
| 51 | 15 | 95.1 | 64.7 | 2.59 | 1.83 | 96.7 | 25 |
| 52 | 16 | 95.0 | 64.6 | 3.87 | 1.90 | 96.2 | 17 |
| 53 | 17 | 95.2 | 64.7 | 4.31 | 1.81 | 96.4 | 15 |
| 54 | 18 | 96.1 | 65.3 | 4.66 | 1.79 | 96.5 | 14 | lyzed by the homogeneous rare earth catalyst 4; FIG. 2 showed that as the polymerization time went on, the polymerization yield gradually increased, the polymerization was basically completed in 4 h, such that an optimal polymerization time was 4 h.

It was seen from Table 4 that when the homogeneous rare earth catalysts 1 to 18 were used in catalyzing the homopolymerization of isoprene, there were averagely 7 to 24 polymer chains produced by each active center, and the obtained polyisoprene had a cis-1,4 structure content of greater than 95.2% and an $M_w/M_n$ ratio of less than 2.0, indicating that the rare earth catalyst had a high activity, and the obtained polymer had a high cis content and a narrow molecular weight distribution.

IV. Influence of Molar Ratio ([IP]/[Nd]) of Isoprene Monomer and Rare Earth Atoms in Catalyst on Homopolymerization of Isoprene In a dry 100 mL ampoule filled with nitrogen, a hexane solution of isoprene (with a concentration of 1.5 mol/L) and a catalyst (one of the homogeneous rare earth catalysts 6, 10, 14, and 18) at a certain ratio ([IP]/[Nd]=3000-30000) were added sequentially; polymerization was conducted; after the polymerization was completed, a product was subjected to reaction termination, washing, and drying in sequence to obtain colorless, transparent, and gel-free polyisoprene rubber. The results were shown in Table 5.

was less than 2, indicating that reversible chain transfer was still maintained during the polymerization, resulting in controllable polymerization; there were averagely no less than 9 polymer chains per active center, indicating that the homogeneous rare earth catalyst had a high activity.

V. Homogeneous Rare Earth Catalysts 1 to 18 in Catalyzing Copolymerization of Butadiene-Isoprene In a dry 100 mL ampoule filled with nitrogen, a mixed hexane solution containing butadiene and isoprene at a certain proportion (with a monomer concentration of 1.5 mol/L) and a catalyst (one of the homogeneous rare earth catalysts 1 to 18) were added in sequence, where the

TABLE 5

| | | | | | | | | | | |
|---|---|---|---|---|---|---|---|---|---|---|
| | | | Influence of [IP]/[Nd] on homopolymerization of isoprene | | | | | | | |
| Use Example | Homogeneous rare earth catalyst | Polymerization temperature | [IP]/[Nd] | Polymerization time (h) | Yield (wt %) | $M_n^{theo}$ (*10⁴) | $M_n^{exp}$ (*10⁴) | $M_w/M_n$ | Cis-1,4% | $N_p$ |
| 55 | 6 | 20 | 3000 | 12 | 100 | 16.2 | 1.47 | 1.58 | 96.1 | 11 |
| 56 | 6 | 50 | 5000 | 6 | 91.9 | 24.8 | 2.26 | 1.62 | 96.5 | 11 |
| 57 | 6 | 50 | 15000 | 6 | 92.3 | 74.8 | 5.75 | 1.85 | 96.8 | 13 |
| 58 | 6 | 50 | 30000 | 8 | 81.8 | 132.5 | 14.7 | 1.94 | 96.7 | 9 |
| 59 | 6 | 50 | 50000 | 8 | 83.5 | 225.5 | 32.2 | 2.21 | 97.2 | 7 |
| 60 | 6 | 80 | 10000 | 1 | 94.6 | 51.1 | 4.26 | 1.78 | 96.6 | 12 |
| 61 | 10 | 50 | 3000 | 6 | 98.9 | 16.0 | 0.73 | 1.51 | 95.5 | 22 |
| 62 | 10 | 50 | 15000 | 6 | 96.5 | 78.2 | 3.72 | 1.61 | 96.9 | 21 |
| 63 | 10 | 50 | 20000 | 6 | 86.7 | 93.6 | 5.20 | 1.9 | 97.8 | 18 |
| 64 | 10 | 60 | 3000 | 1 | 100 | 16.2 | 0.68 | 1.42 | 97.9 | 24 |
| 65 | 10 | 60 | 15000 | 6 | 97.8 | 79.2 | 3.77 | 1.88 | 97.8 | 21 |
| 66 | 10 | 60 | 20000 | 6 | 89.5 | 96.7 | 4.83 | 1.98 | 96.9 | 20 |
| 67 | 14 | 50 | 3000 | 2 | 100 | 16.2 | 1.16 | 1.38 | 97.9 | 14 |
| 68 | 14 | 50 | 15000 | 6 | 94.5 | 76.5 | 6.38 | 1.85 | 97.5 | 12 |
| 69 | 14 | 50 | 20000 | 6 | 86.5 | 93.4 | 7.79 | 1.92 | 97.9 | 12 |
| 70 | 18 | 50 | 3000 | 2 | 96.7 | 15.7 | 0.68 | 1.25 | 96.8 | 23 |
| 71 | 18 | 50 | 15000 | 6 | 85.8 | 69.5 | 3.16 | 1.75 | 98.0 | 22 |
| 72 | 18 | 50 | 20000 | 6 | 86.5 | 93.4 | 4.06 | 1.88 | 97.6 | 23 |

It was seen from Table 5 that: when the homogeneous rare earth catalysts 6, 10, 14, and 18 were used in catalyzing the homopolymerization of isoprene, even if the [IP]/[Nd] ratio was as high as 50,000, a theoretical molecular weight of polyisoprene was 2.255 million; however, an actual molecular weight was 322,000, and a molecular weight distribution monomer had a charging ratio [BD+IP]/[Nd] of 10000, and [BD]/[IP]=1/1; polymerization was conducted at 50° C.; after the polymerization was completed, a product was subjected to reaction termination, washing, and drying in sequence to obtain colorless, transparent, and gel-free butadiene-isoprene rubber. The results were shown in Table 6.

TABLE 6

| | | | | | | | | |
|---|---|---|---|---|---|---|---|---|
| | | Copolymerization of butadiene-isoprene catalyzed by homogeneous rare earth catalysts 1 to 18 | | | | | | |
| Use Example | Homogeneous rare earth catalyst | Polymerization time (h) | Yield (wt %) | Copolymer component | $M_n^{theo}$ (*10⁴) | $M_n^{exp}$ (*10⁴) | $M_w/M_n$ | $N_p$ |
| 73 | 1 | 4 | 95.2 | 1/1.10 | 58.1 | 3.05 | 1.79 | 19 |
| 74 | 2 | 4 | 96.3 | 1/0.99 | 58.7 | 3.26 | 1.82 | 18 |
| 75 | 3 | 4 | 96.2 | 1/1.04 | 58.7 | 3.91 | 1.88 | 15 |
| 76 | 4 | 4 | 94.9 | 1/1.06 | 57.9 | 7.24 | 1.85 | 8 |
| 77 | 5 | 4 | 96.5 | 1/1.13 | 58.9 | 4.53 | 1.89 | 13 |
| 78 | 6 | 4 | 98.3 | 1/1.10 | 60.0 | 5.00 | 1.64 | 12 |
| 79 | 7 | 4 | 96.1 | 1/1.08 | 58.6 | 3.91 | 1.76 | 15 |
| 80 | 8 | 6 | 95.8 | 1/0.98 | 58.4 | 3.65 | 1.93 | 16 |
| 81 | 9 | 6 | 96.2 | 1/1.01 | 58.7 | 2.79 | 1.91 | 21 |
| 82 | 10 | 6 | 94.3 | 1/0.97 | 57.5 | 3.38 | 1.98 | 17 |
| 83 | 11 | 6 | 95.7 | 1/0.98 | 58.4 | 6.49 | 1.95 | 9 |
| 84 | 12 | 6 | 94.9 | 1/1.01 | 57.9 | 2.41 | 1.97 | 24 |
| 85 | 13 | 6 | 96.8 | 1/1.14 | 59.0 | 7.38 | 1.89 | 8 |
| 86 | 14 | 6 | 95.8 | 1/1.20 | 58.4 | 4.50 | 1.86 | 13 |
| 87 | 15 | 6 | 96.9 | 1/0.97 | 59.1 | 2.57 | 1.87 | 23 |

TABLE 6-continued

| | | | | | | | | |
|---|---|---|---|---|---|---|---|---|
| Copolymerization of butadiene-isoprene catalyzed by homogeneous rare earth catalysts 1 to 18 | | | | | | | | |
| Use Example | Homogeneous rare earth catalyst | Polymerization time (h) | Yield (wt %) | Copolymer component | $M_n^{theo}$ (*10$^4$) | $M_n^{exp}$ (*10$^4$) | $M_w/M_n$ | $N_p$ |
| 88 | 16 | 6 | 95.8 | 1/1.12 | 58.4 | 2.43 | 1.65 | 24 |
| 89 | 17 | 6 | 95.3 | 1/1.21 | 58.1 | 3.88 | 1.78 | 15 |
| 90 | 18 | 6 | 94.9 | 1/1.14 | 57.9 | 2.41 | 1.83 | 24 |

It was seen from Table 6 that when the homogeneous rare earth catalysts 1 to 18 were used in catalyzing the copolymerization of butadiene-isoprene, there were averagely 8 to 24 polymer chains produced by each active center, and the butadiene-isoprene rubber had a cis-1,4 structure content of greater than 94.3% and an $M_w/M_n$ ratio of less than 2.0, indicating that the rare earth catalyst had a high activity and controllable polymerization, and the obtained polymer had a high-cis content and a narrow molecular weight distribution.

VI. Influence of Molar Ratio ([BD+IP]/[Nd]) of Butadiene+Isoprene Monomers and Rare Earth Atoms in Catalyst on Copolymerization In a dry 100 mL ampoule filled with nitrogen, a mixed hexane solution containing butadiene and isoprene and the homogeneous rare earth catalyst 5 were added in sequence according to [BD+IP]/[Nd]=3000-30000 and a charging ratio of [BD]/[IP]=(1:20) to (20:1); polymerization was conducted at 50° C. for 4 h; after the polymerization was completed, a product was subjected to reaction termination, washing, and drying in sequence to obtain colorless, transparent, and gel-free butadiene-isoprene rubber. The results were shown in Table 7.

produced by each active center. When used in catalyzing the homopolymerization of isoprene, the polyisoprene has a number average molecular weight reaching 322,000, a cis-1,4 structure content of more than 95.2%, and an $M_w/M_n$ ratio of less than 2.0, and there are averagely greater than 7 polymer chains produced by each active center. When being used in catalyzing the copolymerization of butadiene-isoprene, the cis-1,4 structure content is greater than 94.3% and the $M_w/M_n$ ratio is less than 2.0; even if a molar ratio of the monomer and rare earth atoms in the catalyst is as high as 30,000, the polymerization product has a molecular weight distribution of still less than 2, indicating that reversible chain transfer is still maintained during the polymerization, resulting in controllable polymerization; there are averagely not less than 9 polymer chains produced by each active center, indicating the homogeneous rare earth catalyst has a high activity.

The above descriptions are merely preferred implementations of the present disclosure. It should be noted that a person of ordinary skill in the art may further make several improvements and modifications without departing from the principle of the present disclosure, but such improvements

TABLE 7

| | | | | | | | | |
|---|---|---|---|---|---|---|---|---|
| Influence of [BD + IP]/[Nd] on copolymerization | | | | | | | | |
| Use Example | [BD + IP]/Nd | [BD]/[IP] charging ratio | Yield (wt %) | Copolymer component | $M_n^{theo}$ (*10$^4$) | $M_n^{exp}$ (*10$^4$) | $M_w/M_n$ | $N_p$ |
| 91 | 3000 | 1/1 | 100 | 1/1.05 | 18.3 | 1.83 | 1.61 | 10 |
| 92 | 15000 | 1/1 | 94.9 | 1/1.03 | 86.8 | 7.24 | 1.79 | 12 |
| 93 | 30000 | 1/1 | 95.1 | 1/1.04 | 174.0 | 15.82 | 1.94 | 11 |
| 94 | 10000 | 1/5 | 96.5 | 1/5.10 | 63.4 | 6.34 | 1.43 | 10 |
| 95 | 10000 | 1/10 | 95.8 | 1/10.1 | 63.9 | 5.81 | 1.33 | 11 |
| 96 | 10000 | 1/20 | 93.8 | 1/20.2 | 63.2 | 5.74 | 1.31 | 11 |
| 97 | 10000 | 5/1 | 95.6 | 4.94/1 | 53.9 | 5.39 | 1.28 | 10 |
| 98 | 10000 | 10/1 | 96.3 | 10.1/1 | 53.2 | 4.44 | 1.35 | 12 |
| 99 | 10000 | 20/1 | 97.9 | 19.7/1 | 53.5 | 4.87 | 1.32 | 11 |

It was seen from Table 7 that when the homogeneous rare earth catalyst 5 was used in catalyzing the copolymerization of butadiene and isoprene, even if a molar ratio [BD+IP]/[Nd] was as high as 30000, the butadiene-isoprene rubber had a molecular weight distribution of still less than 2, indicating that reversible chain transfer was still maintained during the polymerization, resulting in controllable polymerization; and there were averagely not less than 10 polymer chains produced by each active center, indicating that the homogeneous rare earth catalyst had a high activity.

In summary, in the present disclosure, when the homogeneous rare earth catalysts 1 to 18 prepared by the preparation method are used in catalyzing the homopolymerization of butadiene, the polymer has a number average molecular weight reaching 285,000, a cis-1,4 structure content of more than 95%, and an $M_w/M_n$ ratio of less than 2.0, and there are averagely greater than 9 polymer chains and modifications should be deemed as falling within the protection scope of the present disclosure.

What is claimed is:

1. A preparation method of a homogeneous rare earth catalyst, the preparation method comprising:

in a dry inert atmosphere, adding an electron donor, alkyl aluminum, and a depolymerizing agent sequentially into a rare earth neodymium-based organic compound to conduct alkylation, and adding a chloride to conduct chlorination to obtain the homogeneous rare earth catalyst;

wherein the rare earth neodymium-based organic compound, the electron donor, the alkyl aluminum, the depolymerizing agent, and the chloride are in a molar ratio of 1:(4-22):(8-42):(2-14):(0.8-4);

the depolymerizing agent is one selected from the group consisting of an alkyl boron compound, a phosphate compound, and a nitrogen-containing compound without active hydrogen; and the alkyl boron compound is one selected from the group consisting of triethyl borane, triallylborane, and tri-n-butyl borane; the phosphate compound is one selected from the group consisting of triethyl phosphate, tributyl phosphate, and triphenyl phosphate; and the nitrogen-containing compound without active hydrogen is one selected from the group consisting of triethylamine, tri-n-butylamine, trioctylamine, pyridine, and 2,6-dibromopyridine.

2. The preparation method according to claim 1, wherein the rare earth neodymium-based organic compound is one selected from the group consisting of neodymium neodecanoate, neodymium isooctanoate, neodymium naphthenate, neodymium isopropoxide, neodymium isobutoxide, neodymium (2-ethylhexyl) phosphonate, and neodymium mono-2-ethylhexyl (2-ethylhexyl) phosphonate.

3. The preparation method according to claim 1, wherein the electron donor is one selected from the group consisting of butadiene, isoprene, piperylene, 1,3,5-hexatriene, and myrcene.

4. The preparation method according to claim 1, wherein the alkyl aluminum is selected from the group consisting of diisobutylaluminum hydride and diethylaluminum hydride.

5. The preparation method according to claim 1, wherein the alkylation is conducted at 30° C. to 85° C. for 5 minutes to 40 minutes.

6. The preparation method according to claim 1, wherein the chloride is selected from the group consisting of dichlorodimethylsilane and ethylaluminium sesquichloride.

7. The preparation method according to claim 1, wherein the chlorination is conducted at 30° C. to 110° C. for 10 minutes to 80 minutes.

8. A homogeneous rare earth catalyst prepared in a dry inert atmosphere, wherein a preparation of the homogeneous rare earth catalyst comprises:

adding an electron donor, alkyl aluminum, and a depolymerizing agent sequentially into a rare earth neodymium-based organic compound to conduct alkylation, and adding a chloride to conduct chlorination to obtain the homogeneous rare earth catalyst; wherein the rare earth neodymium-based organic compound, the electron donor, the alkyl aluminum, the depolymerizing agent, and the chloride are in a molar ratio of 1:(4-22):(8-42): (2-14):(0.8-4);

the depolymerizing agent is one selected from the group consisting of an alkyl boron compound, a phosphate compound, and a nitrogen-containing compound without active hydrogen; and the alkyl boron compound is one selected from the group consisting of triethyl borane, triallylborane, and tri-n-butyl borane; the phosphate compound is one selected from the group consisting of triethyl phosphate, tributyl phosphate, and triphenyl phosphate; and the nitrogen-containing compound without active hydrogen is one selected from the group consisting of triethylamine, tri-n-butylamine, trioctylamine, pyridine, and 2,6-dibromopyridine.

9. The homogeneous rare earth catalyst according to claim 8, wherein the homogeneous rare earth catalyst is used in a process for polymerization of a conjugated diolefin, the process comprising:

adding a hexane solution of a conjugated diolefin monomer and the homogeneous rare earth catalyst to a dry ampoule filled with nitrogen, and conducting polymerization at 20° C. to 80° C. for 1 hour to 12 hours; adding an ethanol solution of 2,6-di-tert-butyl-p-cresol with a mass fraction of 1% to terminate a reaction; and subjecting a polymerization product to ethanol precipitation, washing, and drying sequentially to obtain a diolefin polymer.

10. The homogeneous rare earth catalyst according to claim 8, wherein the rare earth neodymium-based organic compound is one selected from the group consisting of neodymium neodecanoate, neodymium isooctanoate, neodymium naphthenate, neodymium isopropoxide, neodymium isobutoxide, neodymium (2-ethylhexyl) phosphonate, and neodymium mono-2-ethylhexyl (2-ethylhexyl) phosphonate.

11. The homogeneous rare earth catalyst according to claim 8, wherein the electron donor is one selected from the group consisting of butadiene, isoprene, piperylene, 1,3,5-hexatriene, and myrcene.

12. The homogeneous rare earth catalyst according to claim 8, wherein the alkyl aluminum is selected from the group consisting of diisobutylaluminum hydride and diethylaluminum hydride.

13. The homogeneous rare earth catalyst according to claim 8, wherein the alkylation is conducted at 30° C. to 85° C. for 5 minutes to 40 minutes.

14. The homogeneous rare earth catalyst according to claim 8, wherein the chloride is selected from the group consisting of dichlorodimethylsilane and ethylaluminium sesquichloride.

15. The homogeneous rare earth catalyst according to claim 8, wherein the chlorination is conducted at 30° C. to 110° C. for 10 minutes to 80 minutes.

16. The preparation method according to claim 1, wherein the alkyl boron compound is one selected from the group consisting of triethyl borane and tri-n-butyl borane.

* * * * *